United States Patent
Kim

(10) Patent No.: US 8,232,906 B2
(45) Date of Patent: Jul. 31, 2012

(54) IMAGE PROCESSING SYSTEM AND CONTROL METHOD THEREOF

(75) Inventor: Min-sup Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 491 days.

(21) Appl. No.: 12/427,350

(22) Filed: Apr. 21, 2009

(65) Prior Publication Data

US 2010/0060504 A1 Mar. 11, 2010

(30) Foreign Application Priority Data

Sep. 10, 2008 (KR) .................. 10-2008-0089379

(51) Int. Cl.
*G08C 19/12* (2006.01)
*H04L 17/02* (2006.01)
(52) U.S. Cl. ........................................ 341/176
(58) Field of Classification Search .................. 341/176
See application file for complete search history.

(56) References Cited

U.S. PATENT DOCUMENTS

| 6,292,283 | B1 | 9/2001 | Grandbois |
| 7,158,047 | B2 * | 1/2007 | Ushida ..................... 340/12.54 |
| 2004/0137878 | A1 | 7/2004 | Oyama |
| 2008/0028430 | A1 | 1/2008 | Kreiner et al. |
| 2009/0003240 | A1 | 1/2009 | Negron et al. |

FOREIGN PATENT DOCUMENTS

| EP | 1296483 A1 | 3/2003 |
| JP | 2003-23679 A | 1/2003 |
| KR | 1020020033969 A | 10/2000 |
| KR | 1020060016649 A | 2/2006 |
| WO | 01/73720 A1 | 10/2001 |

* cited by examiner

*Primary Examiner* — Hal Kaplan
(74) *Attorney, Agent, or Firm* — Sughrue Mion, PLLC

(57) ABSTRACT

There are provided an image processing system and a control method thereof. The image processing system includes a control terminal which outputs control information for controlling an operation of at least one image processing apparatus according to a preset input through a wireless communication protocol, and a relay unit which converts the control information outputted from the control terminal into an infrared code and outputs the converted infrared code to the image processing apparatus, to control the operation of the image processing apparatus according to the control information.

10 Claims, 6 Drawing Sheets

IMAGE PROCESSING SYSTEM AND CONTROL METHOD THEREOF

CROSS-REFERENCE TO RELATED APPLICATION

This application claims priority from Korean Patent Application No. 10-2008-0089379, filed on Sep. 10, 2008 in the Korean Intellectual Property Office, the disclosure of which is incorporated herein by reference.

BACKGROUND OF THE INVENTION

1. Field of Invention

Systems and methods consistent with the present invention relate to an image processing system and a control method thereof, and more particularly, to an image processing system having a configuration for relaying a control signal from a control terminal and a control method thereof.

2. Description of Related Art

An image processing apparatus such as a TV, set-top box, VCR, DVD or Blu-ray player processes an image signal inputted from outside or generated therein to be displayed.

Recently, a plurality of image processing apparatuses are connected with each other through wired or wireless communication.

Further, each image processing apparatus is provided with a remote controller having a user interface which is embodied as keys or buttons to control an operation of the image processing apparatus by a user.

Since each image processing apparatus may have a different function, it is difficult to control different image processing apparatuses with a remote controller for use with a specific image processing apparatuses.

Further, even in the case of the same image processing apparatuses, codes transmitted from a remote controller differ from each other according to manufacturers or models, and thus, different image processing apparatuses cannot identify a code transmitted from a remote controller for use with a specific image processing apparatus.

Further, in the case that an infrared code is transmitted from a remote controller, if a distance between the remote controller and an image processing apparatus is relatively far, or if there is an obstacle therebetween, an operation of the image processing apparatus may not be easily controlled due to characteristics of infrared rays.

SUMMARY OF THE INVENTION

The present invention provides an image processing system including: a control terminal which outputs control information for controlling an operation of at least one image processing apparatus according to a preset input through a wireless communication protocol; and a relay unit which converts the control information outputted from the control terminal into a converted infrared code and outputs the converted infrared code to the image processing apparatus, to control the operation of the image processing apparatus according to the control information.

The relay unit may communicate with the control terminal through a Zigbee communication protocol.

The relay unit, if the relay unit receives the infrared code having key input information corresponding to the image processing apparatus, may extract the key input information from the received infrared code and transmit the extracted key input information to the control terminal.

The relay unit may receive the infrared code having the key input information from a remote controller corresponding to the image processing apparatus.

The control terminal may include a user input unit, and wherein if the control terminal receives the key input information from the relay unit, the control terminal sets an input of the user input unit to correspond to the received key input information.

The control terminal may further include a display unit which displays a menu comprising key input information and an input code of the user input unit corresponding to the key input information, wherein the input of the user input unit is set through the menu.

The control terminal may store an input setting corresponding to the key input information of each image processing apparatus, and output the control information on the basis of the input setting corresponding to any selected image processing apparatus.

The present also provides a control method of an image processing system, including: performing a preset input through a control terminal, to output control information for controlling an operation of at least one image processing apparatus from the control terminal through a wireless communication protocol; converting the outputted control information into an infrared code by a relay unit; outputting the converted infrared code to the image processing apparatus; and controlling the operation of the image processing apparatus according to the converted infrared code.

The preset input performing may include outputting the control information from the control terminal through a Zigbee communication protocol.

The method may further include: receiving an infrared code comprising key input information corresponding to the image processing apparatus, by the relay unit; extracting the key input information from the received infrared code; and transmitting the extracted key input information to the control terminal.

The infrared code having the key input information may be received by the relay unit through a remote controller corresponding to the image processing apparatus.

The method may further include, if the control terminal receives the key input information from the relay unit, setting an input of a user input unit of the control terminal to correspond to the received key input information.

The input setting may include displaying a menu which has key input information and an input code of the user input unit corresponding to the key input information, wherein the input of the user input unit is set through the menu.

Alternatively, the input setting may include: storing the input setting corresponding to the key input information of each image processing apparatus; and outputting, if any image processing apparatus is selected, the control information on the basis of the input setting corresponding to the selected image processing apparatus.

BRIEF DESCRIPTION OF DRAWINGS

The present invention will become apparent and more readily appreciated from the following description of the exemplary embodiments, taken in conjunction with the accompanying drawings, in which.

DETAILED DESCRIPTION OF EXEMPLARY EMBODIMENTS OF THE INVENTION

Figure 1:
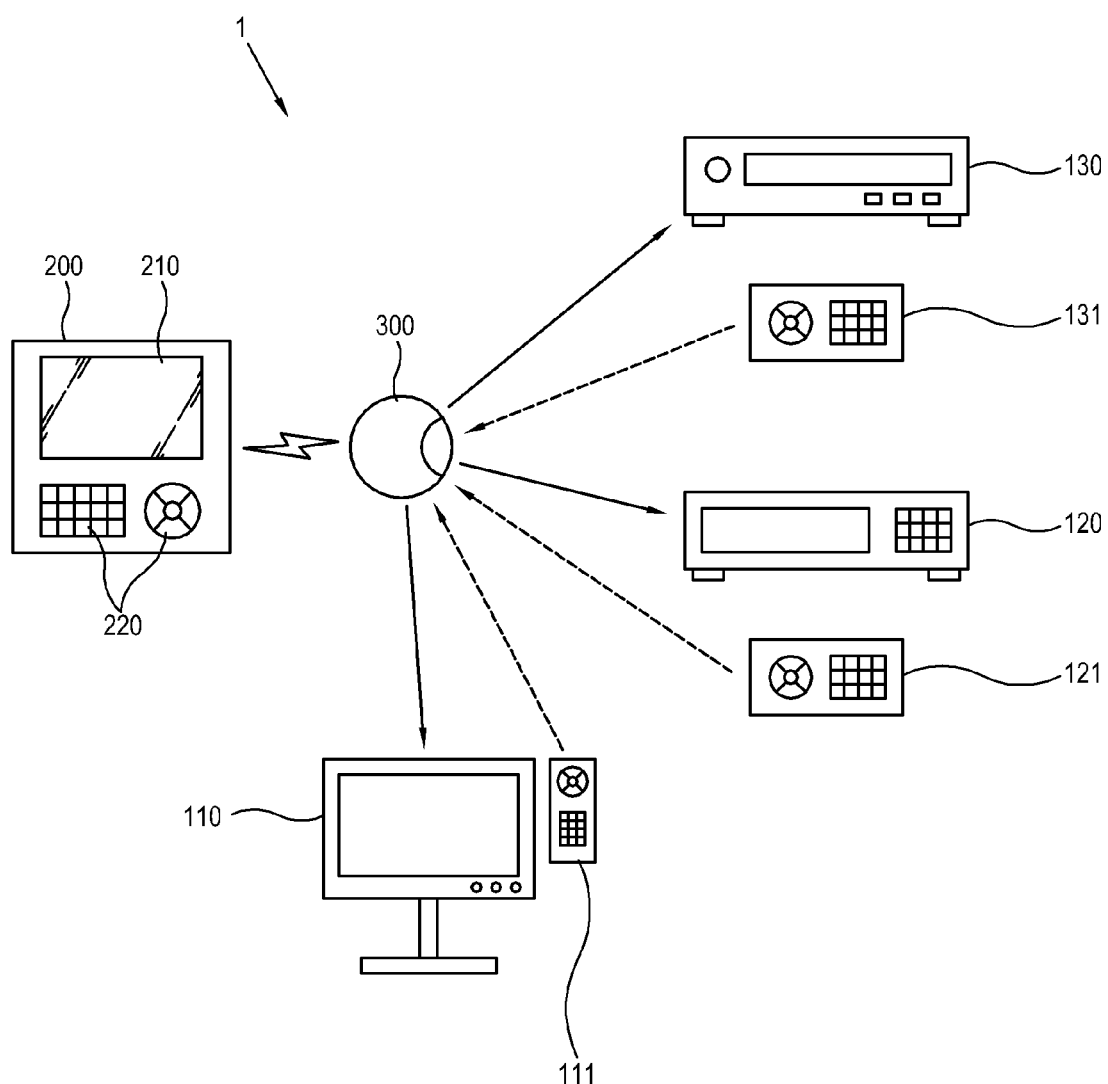
FIG. 1 schematically illustrates an image processing system according to an exemplary embodiment of the present invention.

Reference will now be made in detail to the embodiments of the present invention, examples of which are illustrated in the accompanying drawings, wherein like reference numerals refer to like elements throughout. The exemplary embodiments are described below so as to explain the present invention by referring to the figures. Redundant description to different embodiments may be omitted as necessary.

FIG. 1 schematically illustrates an image processing system 1 according to an exemplary embodiment of the present invention.

As shown in FIG. 1, the image processing system 1 includes one or more image processing apparatuses 110, 120 and 130; a control terminal 200 for controlling operations of the image processing apparatuses 110, 120 and 130; and a relay unit 300 for relaying between the image processing apparatuses 110, 120 and 130 and the control terminal 200.

If the control terminal 200 outputs control information for controlling an operation of any one of the image processing apparatuses 110, 120 and 130 according to a preset input, the relay unit 300 converts the control information from the control terminal 200 into an infrared code and outputs the converted infrared code to the corresponding image processing apparatus 110, 120 or 130, to thereby control the operation of the corresponding image processing apparatus 110, 120 or 130 according to the control information.

The control terminal 200 may communicate with the relay unit 300 through a wireless communication protocol, for example, a Zigbee communication protocol.

The image processing apparatuses 110, 120 and 130 which each are controlled by the control terminal 200 may include a TV, set top box, VCR, DVD player, Blu-ray player, and the like. Three image processing apparatuses 110, 120 and 130 are shown in FIG. 1 by way of example, but the type or number thereof is not limited thereto.

The respective image processing apparatuses 110, 120 and 130 is provided with remote controllers 111, 121 and 131. A user may manipulate an input key of the remote controllers 111, 121 and 131 to control an operation of the image processing apparatuses 110, 120 and 130, respectively.

A method for controlling the operations of the image processing apparatuses 110, 120 and 130 by the manipulation of the remote controllers 111, 121 and 131 is described hereinafter by way of example.

The remote controllers 111, 121 and 131 each have key information corresponding to an input key, and the image processing apparatuses 110, 120 and 130 are preset to be operated corresponding to the key information. If a user manipulates the input key through any one of the remote controllers 111, 121 and 131, the remote controller 111, 121 or 131 converts the key input information into an infrared code and outputs the infrared code to the corresponding image processing apparatus 110, 120 or 130. The image processing apparatuses 110, 120 and 130 each have a light receiving part (not shown) for receiving infrared rays and receive the infrared code through the light receiving part.

The image processing apparatus 110, 120 or 130 reads key input information from the received infrared code and performs a corresponding operation.

As described above, key input information of the remote controllers 111, 121 and 131 is required for controlling the operations of the image processing apparatuses 110, 120 and 130. Key binding relating to the key input information will be described later.

The control terminal 200 is manipulated by a user to control the operations of the respective image processing apparatuses 110, 120 and 130. The control terminal 200 stores an identification code corresponding to each of the image processing apparatuses 110, 120 and 130, and may select any one identification code to thereby select the corresponding image processing apparatus 110, 120 or 130.

The control terminal 200 includes a display unit 210 and a user input unit 220, and controls the operations of the image processing apparatuses 110, 120 and 130 through manipulation of the user input unit 220. To this end, the control terminal 200 generates a control signal for controlling the operations of the image processing apparatuses 110, 120 and 130. The generated control signal is transmitted to the relay unit 300 through the Zigbee communication protocol.

The relay unit 300 receives the control signal from the control terminal 200 and converts the control signal into an infrared code to transmit the converted infrared code to the image processing apparatus 110, 120 and 130. Since the relay unit 300 communicates with the image processing apparatuses 110, 120 and 130 by infrared rays, the relay unit 300 is preferably disposed in a short distance from the image processing apparatuses 110, 120 and 130, without any obstacle on a transmission path of the infrared code.

Further, the relay unit 300 may convert an infrared code received from the image processing apparatuses 110, 120 and 130 for transmission to the control terminal 200.

More specifically, if the relay unit 300 receives an infrared code including key input information from the remote controller 111, 121 or 131, the relay unit 300 transmits the key input information through the Zigbee communication protocol to the control terminal 200. Thus, the control terminal 200 performs key binding for enabling the key input information to correspond to the user input unit 220, thereby controlling the operation of the corresponding image processing apparatus 110, 120 or 130 through the user input unit 220.

Hereinafter, the control terminal 200 will be described referring to FIG. 2, which is a block diagram illustrating image processing system 1 in FIG. 1.

Figure 2:
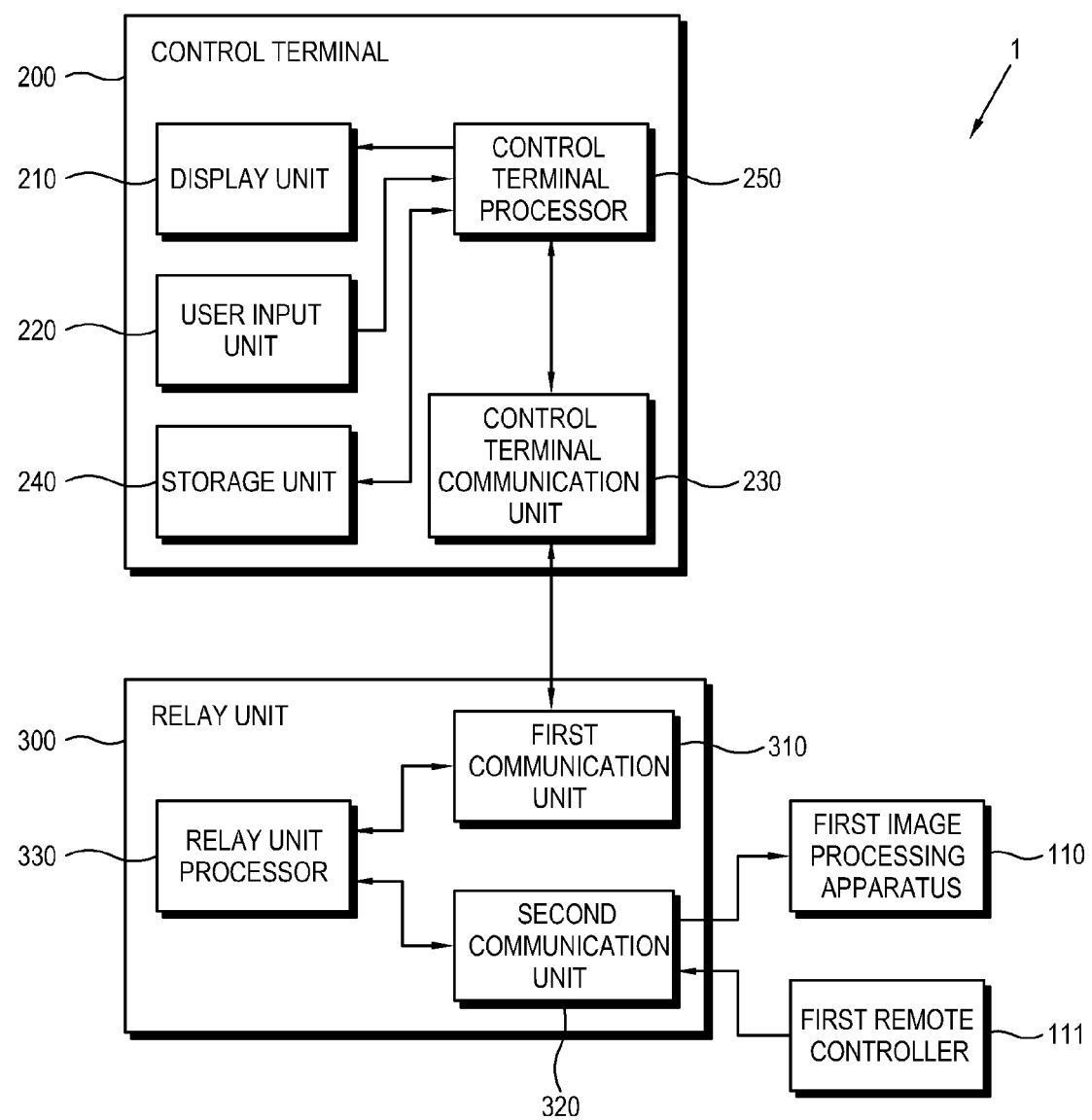
FIG. 2 is a block diagram illustrating the image processing system in FIG. 1.

For convenience of description, only the first image processing apparatus 110 and the first remote controller 111 are illustrated in FIG. 2.

As shown in FIG. 2, the control terminal 200 includes the display unit 210; the user input unit 220; a control terminal communication unit 230 for communication with the relay unit 300; a storage unit 240; and a control terminal processor 250 for controlling these components.

The display unit 210 may be embodied as an LCD panel.

The user input unit 220 may include a plurality of keys and buttons to perform a preset input by a user manipulation. In the present embodiment, the display unit 210 and the user input unit 220 are provided as separate components, but this does not limit the present invention. For example, the display unit 210 may be embodied as a touch-screen, and an input key menu may be displayed on the touch-screen, thereby incorporating the display unit 210 and the user input unit 220.

The control terminal communication unit 230 may communicate with the relay unit 300 by a wireless communication protocol, for example, the Zigbee communication protocol. The Zigbee communication protocol is an IEEE 802.152.4 standard for supporting short distance communication and can transmit data at a speed of 250 Kbps within 30 meters. The Zigbee communication protocol has advantages of low power consumption, small size and low manufacturing cost, compared with other wireless communication protocols.

The storage unit 240 stores predetermined data therein to which the control terminal processor 250 can access. The storage unit 240 may be embodied as a flash memory, a hard disk drive or the like in which data is not volatilized when cutting off power.

The storage unit 240 stores a key binding setting including an identification code of the first image processing apparatus 110 and key input information for operating the first image processing apparatus 110.

If a user selects the first image processing apparatus 110, the control terminal processor 250 accesses the key binding setting of the first image processing apparatus 110 stored in the storage unit 240. The control terminal processor 250 enables the key binding setting to correspond to the user input unit 220.

If a preset input is performed through the user input unit 220, the control terminal processor 250 generates a control signal including the key input information and the identification code of the first image processing apparatus 110.

The control terminal processor 250 transmits the control signal through the control terminal communication unit 230 to the relay unit 300, to then transmit the control signal to the first image processing apparatus 110. In this respect, the control terminal processor 250 may display selection of the first image processing apparatus 110 and contents of the key input information inputted to the user input unit 220, through the display unit 210.

However, when the user selects the first image processing apparatus 110 through the control terminal 200, a corresponding key binding setting may not be stored in the storage unit 240. In this case, a key binding process is performed for setting the key input information of the first image processing apparatus 110 to correspond to the user input unit 220.

The key binding process may be performed by various methods. For example, a database of the key input information of the first image processing apparatus 110 may be received from outside.

Figure 3:
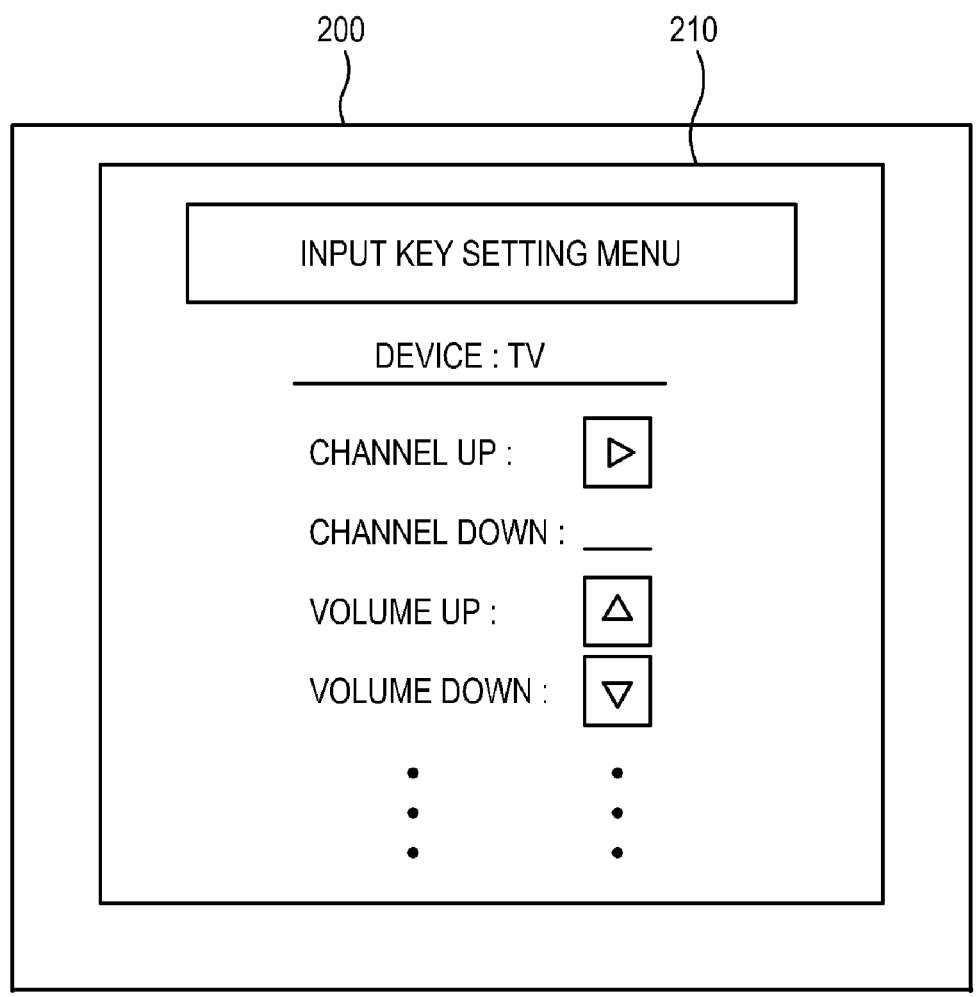
FIG. 3 illustrates an example of a key binding setting menu of a control terminal in the image processing system in FIG. 1.

Alternatively, the control terminal processor 250 may display a key binding setting menu through the display unit 210 (refer to FIG. 3). The menu may include a variety of functions of the first image processing apparatus 110 and a plurality of keys of the user input unit 220 for selecting the functions.

In this case, the user may select, for example, an item for channel-up in the first image processing apparatus 110 from the display menu and manipulate a corresponding key in the first remote controller 111. The first remote controller 111 outputs an infrared code including the manipulated key input information to the relay unit 300, and the relay unit 300 transmits the key input information to the control terminal communication unit 230.

The control terminal processor 250 displays a message for requesting a specific key of the user input unit corresponding to the key input information. If the user selects a key of the user input unit 220, the selected key of the user input unit 220 corresponds to the item for channel-up in the first image processing apparatus 110, thereby performing a key binding setting.

The key binding may be performed for items such as channel-down, volume-up, volume-down and the like in accordance with the above-described process. If the key binding is completed, the control terminal processor 250 stores the key binding setting for the first image processing apparatus 110 in the storage unit 240. Then, when the first image processing apparatus 110 is selected, the control terminal processor 250 may read the key binding setting from the storage unit 240.

Through the above-described key binding process, the user may control the operations of the different image processing apparatuses 110, 120 and 130 using the control terminal 200.

Hereinafter, the relay unit 300 will be described referring to FIG. 2.

The relay unit 300 includes a first communication unit 310 for communication with the control terminal communication unit 230; a second communication unit 320 for outputting an infrared code to the first image processing apparatus 110 or receiving an infrared code from the first remote controller 111; and a relay unit processor 330 for controlling these components.

The first communication unit 310 may include the Zigbee communication protocol similar to the control terminal communication unit 230, so that the relay unit 300 interactively can communicate with the control terminal 200. Accordingly, the first communication unit 310 may receive a control signal from the control terminal 200 and also transmit key input information transmitted from the first remote controller 111 to the control terminal 200.

If a control signal received through the first communication unit 310 is converted into an infrared code by the relay unit processor 330, the second communication unit 320 outputs the infrared code to the first image processing apparatus 110. Further, the second communication unit 320 may receive an infrared code from the first remote controller 111. In the present embodiment, the second communication unit 320 is configured to transmit and receive the infrared code, but transmitting and receiving the infrared code may be each performed by separate components.

The relay unit processor 330 converts a signal received through any one of the first communication unit 310 and the second communication unit 320 for transmission to the other thereof. This is because while the first communication unit 310 is based on the Zigbee communication protocol, the second communication unit 320 is based on the different infrared method.

If the relay unit processor 330 receives a control signal through the first communication unit 310, the relay unit processor 330 confirms an object for the received control signal. For example, the relay unit processor 330 may read a unique identification code included in the control signal and confirm that the control signal relates to the first image processing apparatus 110. The relay unit processor 330 converts the control signal into an infrared code and transmits the converted infrared code to the first image processing apparatus 110 through the second communication unit 320.

In the present embodiment, the confirming process may be omitted. That is, the relay unit processor 330 may convert the control signal into the infrared code and output the converted infrared code through the second communication unit 320, without confirming the object of the control signal. In this case, the plurality of image processing apparatuses 110, 120 and may receive the infrared code outputted through the second communication unit 320, and only the first image processing apparatus 110 corresponding to the identification code included in the corresponding infrared code may operate according to the infrared code.

Further, if the infrared code outputted from the first remote controller 111 is received through the second communication unit 320, the relay unit processor 330 may extract the key input information included in the infrared code and transmit the extracted key input information to the control terminal 200 through the first communication unit 310.

In the above description, the relay unit processor 330 extracts the key input information included in the infrared code, but this does not limit the present invention. For example, the key input information may be extracted by the control terminal 200.

Hereinafter, a process for controlling the operation of the first image processing apparatus 110 through the control terminal 200 by a user will be described referring to FIGS. 4 and 5.

Figure 4:
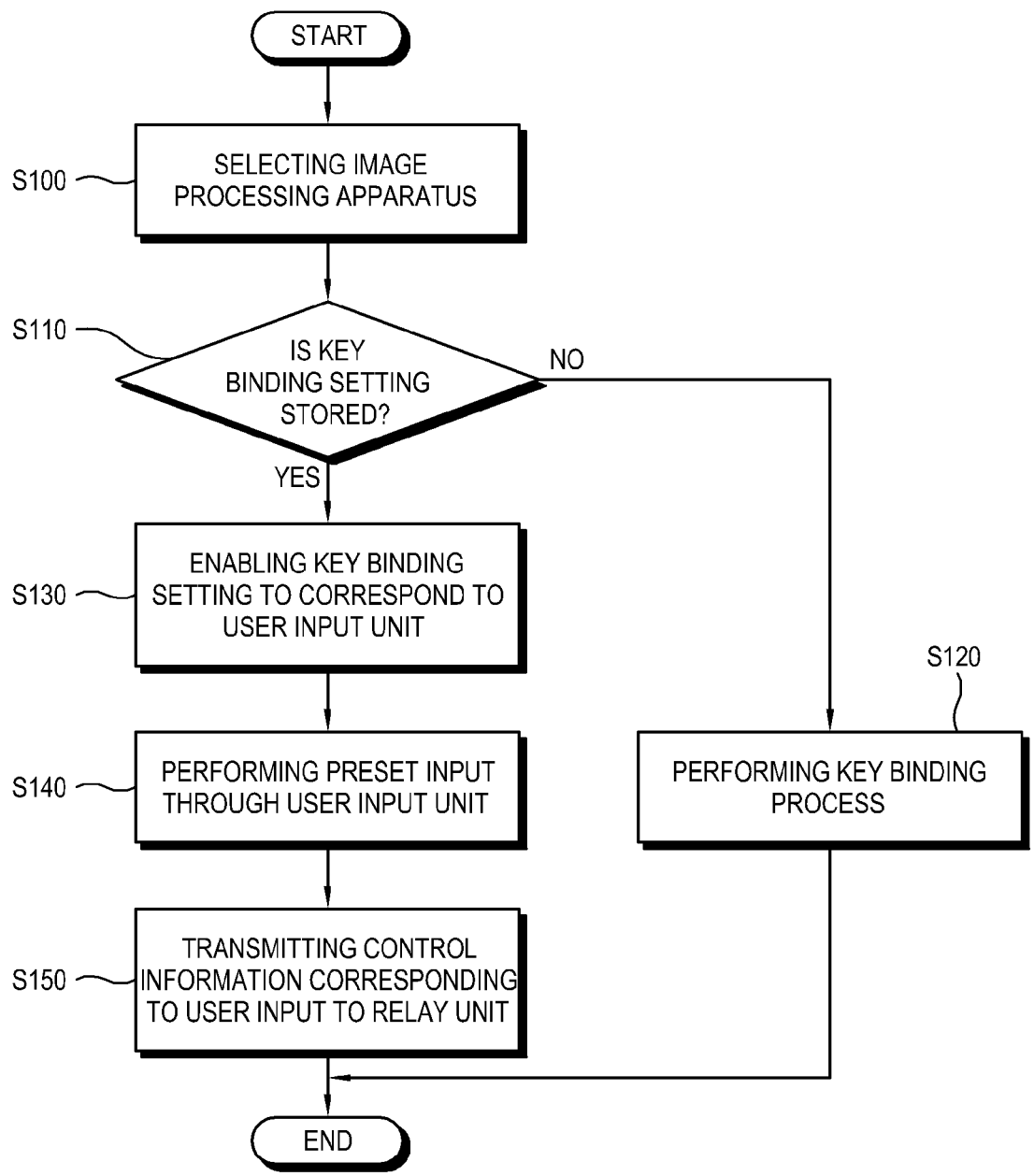
FIG. 4 is a flowchart illustrating a control process of the control terminal in the image processing system in FIG. 1.

As shown in FIG. 4, a user selects the first image processing apparatus 110 through the user input unit 220 of the control terminal 200 (S100).

The control terminal processor 250 determines whether a key binding setting for the first image processing apparatus 110 is stored in the storage unit 240 (S110).

If the key binding setting is not stored in the storage unit 240, a key binding process is performed (S120), which will be described later.

If the key binding setting is stored in the storage unit 240, the control terminal processor 250 reads the key binding setting to correspond to the user input unit 220 (S130). For example, channel-up and channel-down in the first image processing apparatus 110 may correspond to a left and right directional keys in the user input unit 220, respectively; and volume-up and volume-down in the first image processing apparatus 110 may correspond to up and down directional keys in the user input unit 220, respectively.

Next, the user inputs a preset input through the user input unit 220 (S140). For example, for channel-up, the user may manipulate the left directional key in the user input unit 220 on the basis of the above key binding setting.

The control terminal processor 250 transmits control information corresponding to the user input to the relay unit 300 through the Zigbee communication protocol (S150). The control information includes information on an object to be controlled and an operation of the object, for example, on the first image processing apparatus 110 and channel-up therein.

Figure 5:
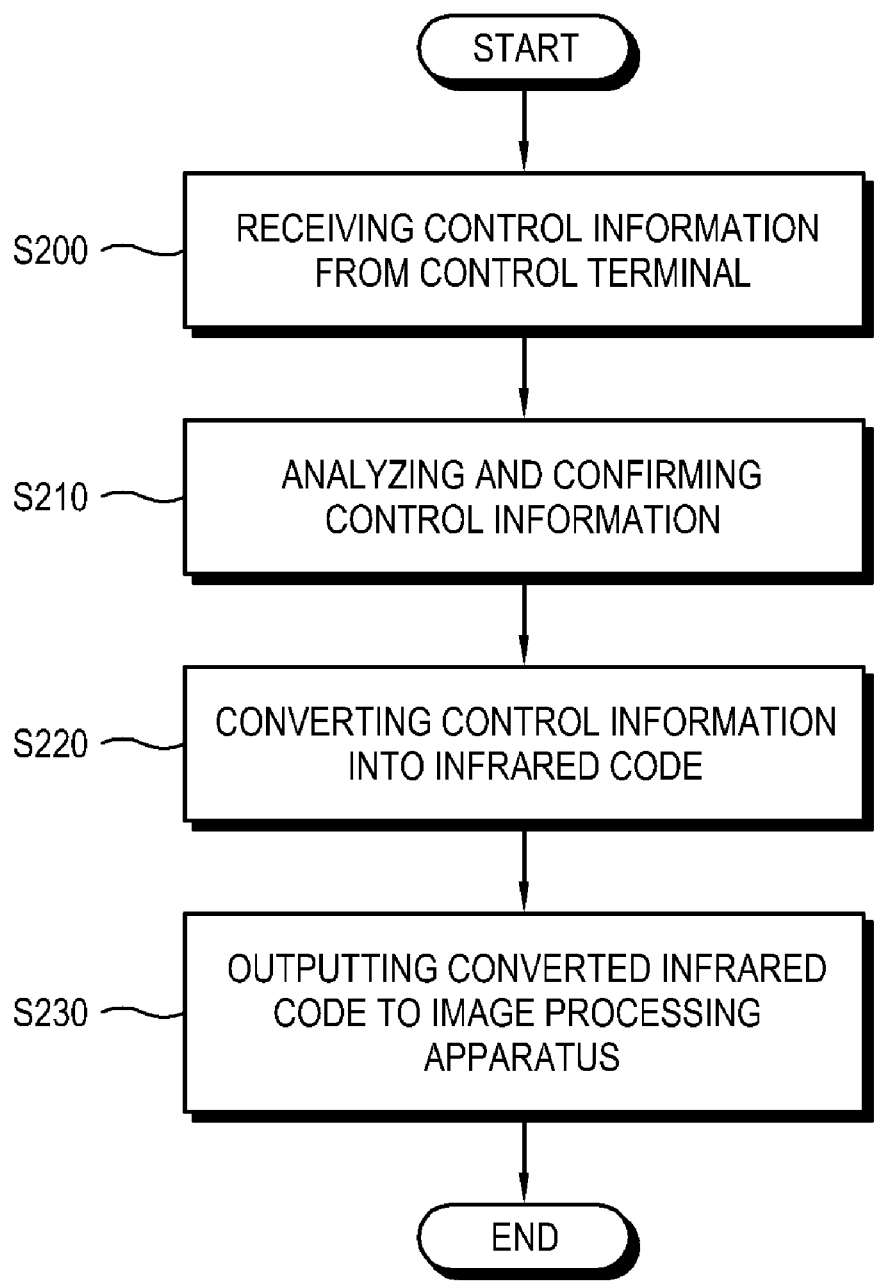
FIG. 5 is a flowchart illustrating a control process of a relay unit in the image processing system in FIG. 1.

As shown in FIG. 5, the control information transmitted from the control terminal 200 is received through the first communication unit 310 (S200).

The relay unit processor 330 analyzes the control information and confirms that the control information relates to the first image processing apparatus 110 (S210).

Then, the relay unit processor 330 converts the control information into an infrared code (S220), and outputs the converted infrared code to the first image processing apparatus 110 (S230). Then, the operation of the first image processing apparatus 110 is controlled according to the received infrared code.

Hereinafter, the key binding process S120 in FIG. 4 will be described referring to FIG. 6.

Figure 6:
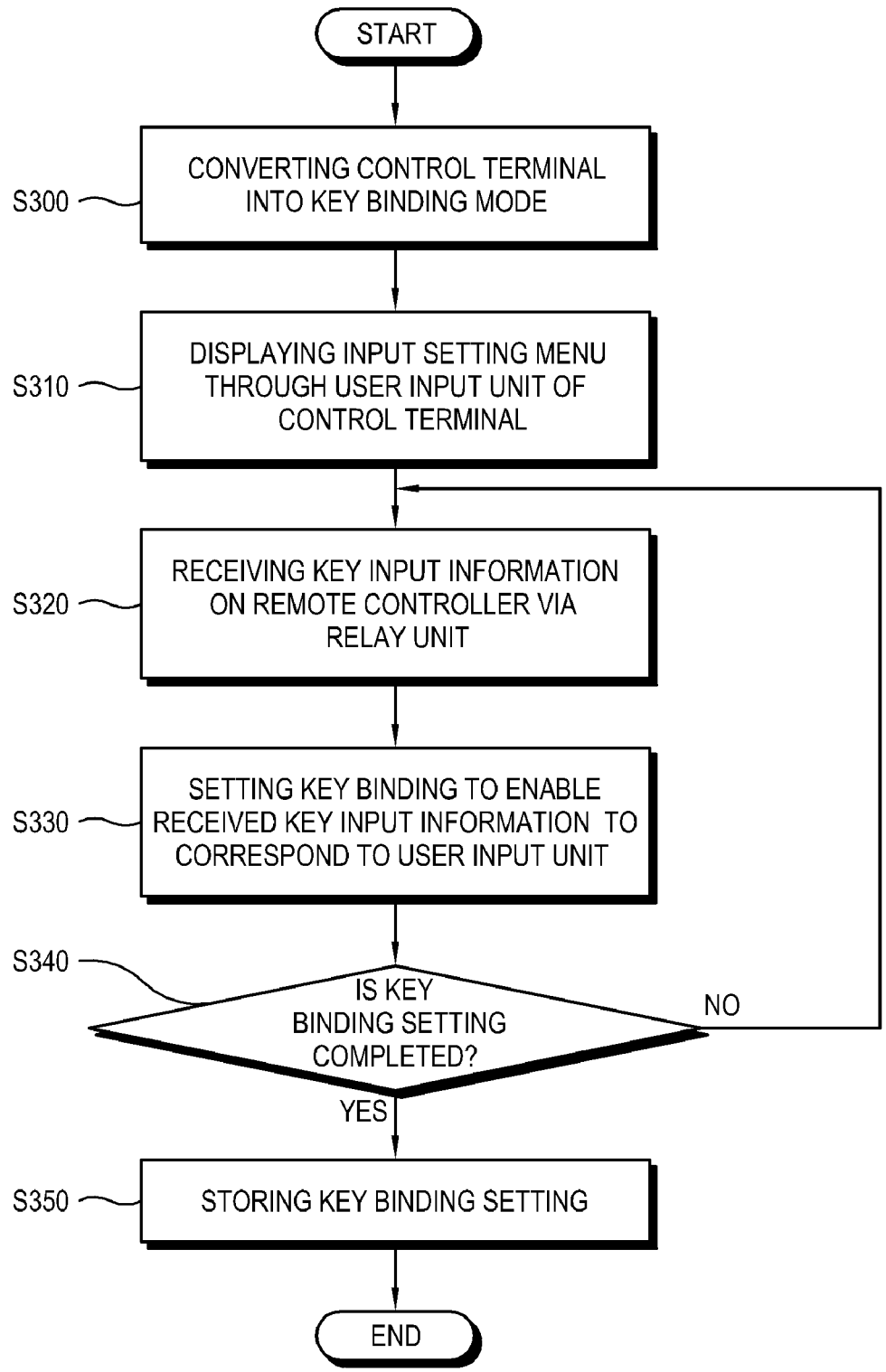
FIG. 6 is a flowchart illustrating a key binding process in the image processing system in FIG. 1.

As shown in FIG. 6, the control terminal processor 250 converts the control terminal 200 into a key binding mode for the first image processing apparatus 110 (S300). This conversion may be accomplished by a user input through the user input unit 220.

The control terminal processor 250 displays a key binding setting menu for the first image processing apparatus 110 through the display unit 210 of the control terminal 200, for example, as shown in FIG. 3 (S310).

Then, key input information is outputted to the relay unit 300 from the first remote controller 111 according to a user selection. Then, the key input information of the first remote controller 111 is received through the control terminal communication unit 230, via the relay unit 300 (S320).

The control terminal processor 250 performs a key binding setting so that the received key input information corresponds to an input of the user input unit 220 (S330). For example, in the case that an item for channel-up in the first image processing apparatus 110 is set, the user may manipulate a key for channel-up in the first remote controller 111 and also manipulate the user input unit 220 corresponding thereto, thereby enabling the control terminal processor 250 to perform the key binding setting.

The key binding setting corresponding to the first image processing apparatus 110 is completed (S340), the key binding setting is stored in the storage unit 240 (S350). In this way, the key binding process for the first image processing apparatus 110 is completed.

As described above, the image processing system 1 according to the exemplary embodiment of the present invention includes the control terminal 200 and the relay unit 300 for the plurality of image processing apparatuses 110, 120 and 130, wherein the control terminal 200 and the relay unit 300 communicate with each other through the Zigbee communication protocol.

Accordingly, operations of the plurality of image processing apparatuses 110, 120 and 130 can be controlled by one control terminal 200. Also, the image processing apparatuses 110, 120 and 130 can be controlled regardless of any obstacle between the control terminal 200 and the relay unit 300.

Further, the image processing system can have small size, low power consumption, light weight and low manufacturing cost due to the Zigbee communication protocol.

Furthermore, the operations of the plurality of image processing apparatuses 110, 120 and 130 having different control codes can be controlled by the control terminal 200 by setting key input information of the image processing apparatuses 110, 120 and 130 in the control terminal 200 by the key binding process.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An image processing system comprising:
    a control terminal which outputs control information for controlling an operation of at least one image processing apparatus according to a preset input through a wireless communication protocol; and
    a relay unit which converts the control information outputted from the control terminal into a first converted infrared code and outputs the first converted infrared code to the image processing apparatus, to control the operation of the image processing apparatus according to the control information;
    wherein the relay unit receives a second infrared code comprising key input information corresponding to the image processing apparatus, extracts the key input information from the received second infrared code, and transmits the extracted key input information to the control terminal; and
    wherein the control terminal comprises a user input unit, wherein the control terminal receives the key input information from the relay unit, and sets an input of the user input unit to correspond to the received key input information.

2. The system according to claim 1, wherein the relay unit communicates with the control terminal through a Zigbee communication protocol.

3. The system according to claim 1, wherein the relay unit receives the second infrared code comprising the key input information from a remote controller corresponding to the image processing apparatus.

4. The system according to claim 1, wherein the control terminal further comprises a display unit which displays a menu comprising the key input information and an input code of the user input unit corresponding to the key input information,
wherein the input of the user input unit is set through the menu.

5. The system according to claim 1, wherein the control terminal stores an input setting corresponding to the key input information of each image processing apparatus, and outputs the control information on the basis of the input setting corresponding to any selected image processing apparatus.

6. A control method of an image processing system, comprising:
performing a preset input through a control terminal, to output control information for controlling an operation of at least one image processing apparatus from the control terminal through a wireless communication protocol;
converting the outputted control information into a first infrared code by a relay unit;
outputting the converted first infrared code to the image processing apparatus;
controlling the operation of the image processing apparatus according to the converted infrared code;
receiving a second infrared code comprising key input information corresponding to the image processing apparatus, by the relay unit;
extracting the key input information from the received second infrared code;
transmitting the extracted key input information to the control terminal; and
setting an input of a user input unit of the control terminal to correspond to the key input information transmitted to the control terminal.

7. The method according to claim 6, wherein the performing the preset input comprises outputting the control information from the control terminal through a Zigbee communication protocol.

8. The method according to claim 6, wherein the second infrared code comprising the key input information is received by the relay unit through a remote controller corresponding to the image processing apparatus.

9. The method according to claim 6, wherein the input setting comprises displaying a menu which has key input information and an input code of the user input unit corresponding to the key input information,
wherein the input of the user input unit is set through the menu.

10. The method according to claim 6, wherein the input setting comprises:
storing the input setting corresponding to the key input information of each image processing apparatus; and
outputting the control information on the basis of the input setting corresponding to a selected image processing apparatus.

* * * * *